J. DENTON AND A. L. SKINNER.
GAS REGULATOR.
APPLICATION FILED OCT. 23, 1919.

1,349,945.

Patented Aug. 17, 1920.

Witnesses

Inventors
John Denton &
A. L. Skinner
By
Attorneys

UNITED STATES PATENT OFFICE.

JOHN DENTON AND ALVA L. SKINNER, OF BRIDGEPORT, ILLINOIS.

GAS-REGULATOR.

1,349,945.     Specification of Letters Patent.     Patented Aug. 17, 1920.

Application filed October 23, 1919. Serial No. 332,758.

*To all whom it may concern:*

Be it known that we, JOHN DENTON and ALVA L. SKINNER, citizens of the United States, residing at Bridgeport, in the county of Lawrence, State of Illinois, have invented certain new and useful Improvements in Gas-Regulators; and we do hereby declare the following to be a full, clear, and exact description of the invention, such as will enable others skilled in the art to which it appertains to make and use the same.

This invention relates to separators for removing gas from oil, and conveying it automatically to a gasolene extracting plant; and the object of the same is to provide means for automatically cutting off the flow of gas to said plant when the volume of gas brought in with the oil decreases.

The invention consists in a novel form of automatic regulator connected up with the tank into which the oil is pumped or into which it may feed from the well. On its course to or within this tank it is usually heated so it will more readily yield its gases, but as the heater forms no part of the present invention it is omitted. After the gas has been extracted the oil flows from the tank referred to into a stock tank or other place of storage, but this feature also is omitted for the same reason. Finally, the details of the gasolene extracting plant are immaterial to the present invention and are likewise omitted. Otherwise the following specification sets forth one successful means for carrying out our invention, reference being made to the accompanying drawings in which:

Figure 1:
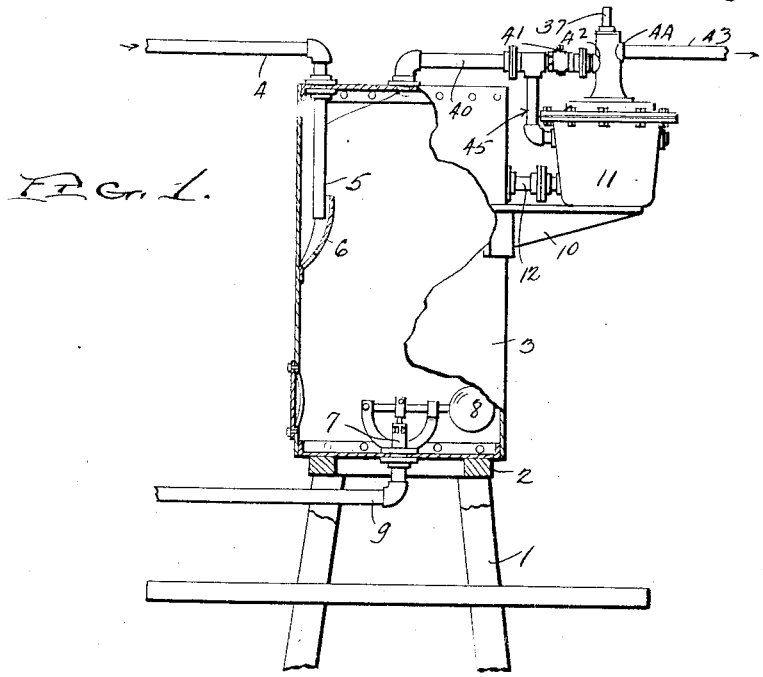
Figure 1 is an elevation of a scaffold carrying a tank which latter is broken away to show details on its interior, and this view gives an elevation of our improved regulator.
Figure 2:
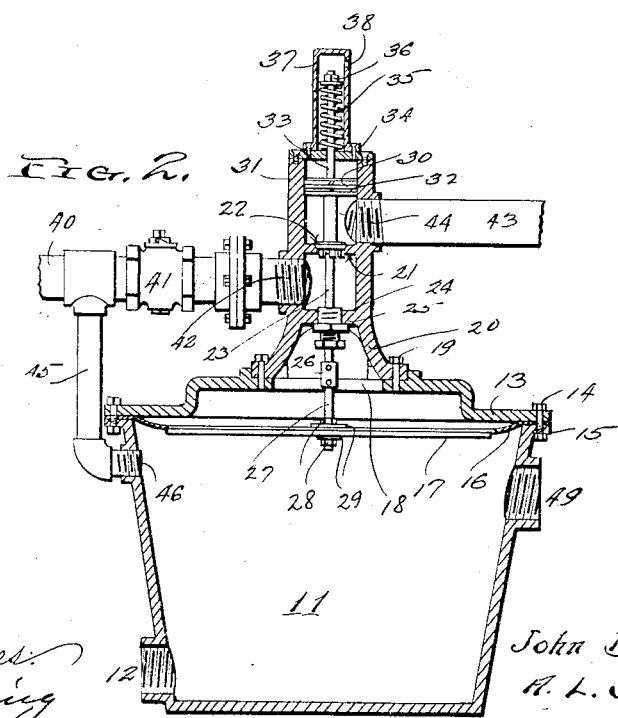
Fig. 2 is an enlarged sectional detail of the regulator itself.

Mounted on legs 1 is an elevated scaffold 2 supporting a tank 3 which is herein shown as taking the form of an upright cylinder, and into the same at a high point leads the feed line 4 from a pump or from a well if the oil flows therefrom with sufficient head; and it is possible that a heater may be employed to heat the oil before or after it reaches the tank. Beneath the outlet end 5 of the pipe 4 is a dash plate 6 serving to break up the oil and cause it to throw off its gases. In the bottom of the tank is a valve 7 opened by a float 8 which may be set to act when the oil reaches the desired level, and when the valve is opened the oil flows out a pipe 9 to a stock tank or other reservoir not shown. It will be observed that there is considerable space in the tank 3 above what would be the level of the oil when it reaches its greatest depth, and the wet gases rising from the oil accumulate in this space. It is the purpose of the present invention to take these gases from the tank and convey them to a gasolene extracting plant, or in other words, to purify the gas so that it may be used and the gasolene and other by-products or impurities or substances carried thereby may also be conserved if they are useful. The mixed oil and gas comes to the tank under some pressure, which at different times and under different conditions will vary to some extent, and this variation is to be considered and overcome by the regulator which forms the gist of our invention and is next to be described.

As shown herein a bracket 10 on the tank supports a receptacle 11 of generally cup-shape wherein will collect the condensation which takes place when the hot gas strikes the relatively cold body of this receptacle. The latter communicates at a low point 12 with the tank, and the condensed oil flows therethrough constantly, or may be permitted to flow on occasions and cut off at others if the drain pipe contains a cock or valve. It might even be possible to provide this pipe with a check valve, but these details are hardly necessary of illustration. The receptacle has a cover 13 secured by bolts 14 passing through it and the flange 15 of the body, and these bolts pass also through a flexible diaphragm 16 which preferably carries a large plate 17 on its lower face to protect it as far as possible from the wet gas. The diaphragm closes the mouth of the receptacle so that the latter becomes a pressure chamber as explained below. At its center the cover has an opening 18, and mounted upon the cover as by screws 19 is an upstanding valve body or casing 20 provided internally with a seat 21 against which closes a valve 22. The valve stem 23 passes down through a stuffing box 24 mounted in a partition 25, and is coupled as at 26 with a stem 27 which is fastened to the diaphragm and its plate as by nuts 28 and washers 29 above and below the same as shown.

The valve stem rises above the valve and carries a piston 30 working within a cylinder 31 and having rings 32 to prevent leakage, and above the piston a rod 33 passes through a cap plate 34 and a coiled spring 35 and carries an adjusting nut 36 at its upper end, the rod and its spring and nut being inclosed within a cap 37 carried by the plate 34 and suitably vented as at 38.

The gas inlet line 40 leads from the top of the tank 3 through a stop cock 41 and into the valve casing at a point 42 between the seat 21 and partition 25, and the gas outlet line 43 leads to the gasolene extracting plant from a point 44 between said seat and the cylinder and its piston 30. A branch pipe or balance line 45 connects the gas line 40 with the pressure chamber within the receptacle 11, entering the latter at a high point as indicated at 46.

Ordinarily the gas is drawn to the extracting plant by suction on the line 43, and this suction is usually sufficient. At the outlet side of the valve of this regulator there is generally a heavy vacuum which is applied to the gas line 43 from the gasolene plant. This draws the gas from the tank 3 through the inlet line 40 and valve 22, but in case the gas should become exhausted in the tank to a considerable degree, the result will of course be a partial vacuum. Through the balance line 45 this vacuum within the pressure chamber immediately acts on the diaphragm 16 which in descending draws down on the stem 23 and closes the valve 22 against its seat 21. The suction through the line 43 is now cut off, and gas accumulates within the tank. Eventually this destroys the vacuum within the chamber 11 beneath the diaphragm, and permits the spring 35 to again open the valve 22; and immediately the gas resumes its flow from the tank to the extracting plant. The purpose of the piston disposed within the cylinder 31 above the outlet 44, is to oppose the tendency of suction on the gas line 43 to open the valve 22; and the purpose of the spring and its adjusting nut 36 is to afford means for counterbalancing the weight of the several elements mounted on the stem and to enable the operator to adjust the same from time to time as necessary. The stem 23 below the valve should be quite small where it passes through the stuffing box, so as to reduce the chance of leakage; and the coupling 26 is obviously for the purpose of disconnecting this stem from the diaphragm stem 27 when the entire valve casing is removed from the cover 13 by withdrawing the screws 19. This regulator can be thrown out of action any time by closing the stop-cock 41. The wall of the receptacle 11 may be provided with an outlet opening 49 which is usually closed by a plug, but when it is possible to pass the gas directly through the receptacle to the extracting plant under its own pressure, a pipe may lead from the opening 49 to the plant and the cock 41 be closed if the regulator is to be put out of action. As above suggested, the condensate within the receptacle may flow constantly into the tank or be drawn off from time to time.

What is claimed is:

1. In a regulator of the type described, the combination with a pressure chamber, a diaphragm therein, a valve casing including a cylinder, a partition, and a seat between them, an inlet line entering a casing between the seat and partition and branched to the pressure chamber, and an outlet line leading from the casing between the seat and cylinder; of a valve coacting with the seat, a piston movable in said cylinder, a stem connecting the valve and piston, a stuffing box in said partition, and a second stem connected with the valve and leading through the stuffing box to said diaphragm.

2. In a regulator of the type described, the combination with a diaphragm and a chamber inclosing the same, a valve casing rising from the chamber and having inlet and outlet openings with a seat between them and a cylinder above the outlet opening, an inlet line leading into the casing below the seat and branched into said chamber, and an outlet line leading from the casing above its seat; of a valve coacting with the seat, a stem depending therefrom and connected with said diaphragm, a stem rising from the valve, and a piston on this stem moving within said cylinder.

3. In a regulator of the type described, the combination with a diaphragm and a chamber inclosing the same, a valve casing having inlet and outlet openings with a seat between them, a partition beyond the inlet opening, and a cylinder beyond the outlet opening, an inlet line leading into said inlet opening and branched into said chamber, and an outlet line leading from the said outlet opening; of a valve coacting with the seat, a stem leading therefrom through the partition and connected with said diaphragm, a second stem leading from the valve, a piston on this stem slidably mounted in said cylinder, a rod leading from the piston, and a spring on the rod tending to unseat the valve, as described.

4. In a regulator of the type described, the combination with a diaphragm and a chamber inclosing the same, a valve casing rising from the chamber and having inlet and outlet openings with a seat between them and a cylinder above the outlet opening, an inlet line leading into the casing below the seat and branched into said chamber, and an outlet line leading from the casing above its seat; of a valve coacting with the seat, a stem depending therefrom and connected with said diaphragm, a stem rising from the valve, a piston on this stem slidably mounted in said cylinder, a cap plate for the latter, a rod rising from the piston through the cap plate, a nut on said rod, and a spring on the rod between the nut and cap plate, as described.

In testimony whereof we affix our signatures, in the presence of two witnesses.

JOHN DENTON.
ALVA L. SKINNER.

Witnesses:
  F. W. KALEY,
  A. B. LEACH.